3,356,750
DEHYDROGENATION PROCESS
Richard F. Bojanowski, Houston, and John W. Herndon, Pasadena, Tex., assignors to Petro-Tex Chemical Corporation, Houston, Tex., a corporation of Delaware
No Drawing. Filed Jan. 14, 1963, Ser. No. 251,044
11 Claims. (Cl. 260—656)

This invention relates to a process for preparing halogen-containing alkenes and relates more particularly to the dehydrogenation of certain halogen-containing hydrocarbons in the presence of oxygen and halogen.

This application is a continuation-in-part of our copending application Ser. No. 18,867, filed Mar. 31, 1960, and now abandoned.

Iodine has been disclosed for use in the oxidative dehydrogenation of organic compounds generally in U.S. Patent 2,719,171, and more specifically, as applied to hydrocarbons in U.S. Patent 2,890,253.

We have now discovered that certain halogen-containing alkenes wherein the halogen is chlorine and/or fluorine are obtained in good yields by dehydrogenating chlorine and/or fluorine-containing alkanes in admixture with oxygen and iodine at elevated temperatures and a partial pressure of halogen-containing alkane of less than one atmosphere.

The invention is suitably carried out, for example, by passing a mixture of haloalkane with at least 0.001 mol of molecular iodine as $I_2$ per mol of haloalkane and at least one-fourth mol of oxygen per mol of haloalkane at a temperature in the range of about 400° C. to about 800° C. at a haloalkane partial pressure equivalent to less than about 15 inches mercury through a reactor containing metals or active compounds thereof of Groups I-A, II-A, II-B, III-A, III-B, IV-A, IV-B, V-A, V-B, VI-B, VII-B, VIII, and the Lanthanum rare earth group of the Periodic Table.

In a typical embodiment of the invention, ethyl chloride in vapor phase is passed through a reactor containing stainless steel packing, in admixture with oxygen at a molar ratio of one mol of ethyl chloride to 0.8 mol of oxygen, iodine in the form of hydrogen iodide at a molar ratio of one mol of ethyl chloride to 0.04 mol of molecular iodine and steam in a molar ratio of 15 mols of steam to one mol of ethyl chloride (partial pressure less than 2 inches mercury absolute) at a temperature of 750° C. and an ethyl chloride flow rate of one-half liquid v./v./hr. Under these reaction conditions, a yield of vinyl chloride from ethyl chloride of 87.5 percent per pass was obtained at a conversion of 96.3 percent, and selectivity of 90.8 percent. The hydrogen iodide by-product is separated from the vinyl chloride, which is thereafter purified as by fractionation.

One feature of the novel process of this invention is that the reaction is preferably conducted in the presence of certain metals and their compounds. These materials may be considered as catalysts for the reaction, although their function and mode of operation is not completely understood. A variety of metals and reactive compounds thereof such as salts and oxides are effective in the obtainment of high conversion, selectivity and yield of alkenes in accordance with the process of this invention. The following materials are illustrative: iron oxide, bismuth oxide, titanium oxide, chromium oxide, tantalum oxide, cerium oxide, tin oxide, zirconium oxide, manganese oxide, molybdenum oxide, vanadium oxide, cobalt oxide, antimony oxide, nickel oxide, tungstic oxide, palladium oxide, magnesium oxide, lanthanum oxide, columbium oxide, calcium oxide, magnesium phosphate, manganese phosphate, lithium phosphate, sodium fluoride, stainless steel in the form of small diameter tubular reactors, stainless steel wool, stainless steel rings, iron, tantalum, manganese, chromium, activated alumina containing chromium oxide coated thereon, aluminum phosphate, vanadium oxyphosphate, molybdenum antimonate, calcium carbonate, calcium sulfate, sodium hydroxide, sodium chloride, potassium oxide, ferrous iodide, chromic chloride, cobalt iodide, manganese iodide, iron phosphide, potassium silicate and barium sulfide. Examples of other useful compounds include molybdenum phosphate, potassium phosphate, barium oxide, potassium fluoride, strontium oxide, calcium fluoride, iron chloride, chromium phosphate, calcium hydroxide, bismuth hydroxide, thorium oxide, barium carbonate, bismuth iodide, iron carbonate, iron sulfate, sodium oxide, iron hydroxide, lithium iodide, bismuth phosphate, iron phosphate, uranium oxide, titanium, iron alloys, lanthanum hydroxide, lanthanum carbonate, cerium hydroxide, and the like.

In general, any metal, and salts, oxides or hydroxides thereof of Groups I-A, II-A, III-B, IV-B, V-B, VI-B, VII-B, VIII, II-B, III-A, IV-A, V-A, are effective in the process of this invention. These groups are based on the conventional long form of the Periodic Table as the Periodic Chart found on pages 400–401 of the 39th edition (1957-58) of Handbook of Chemistry and Physics (Chemical Rubber Publishing Company). Thorium and uranium are considered as an extension of Group IIIB as shown by the Periodic Table referred to above. The use of highly radioactive isotopes of these elements is not normally contemplated, only nonhazardous compounds. Many of these metals, salts, and hydroxides may change during the preparation of the catalyst, during heating in a reactor prior to use in the process of this invention, or are converted to another form under the described reaction conditions, but such materials still function as an effective compound in the defined process to give increased yields of alkenes. Most metals, metal nitrites, nitrates, carbonates, hydroxides, acetates, sulfites, silicates, sulfides and the like are readily converted to the corresponding oxide under the reaction conditions defined herein. For instance, potassium nitrate, iron sulfate and bismuth hydroxide are all converted to the corresponding oxides while being heated in a reactor to a reaction temperature of about 500° C. Such salts as the phosphates, sulfates, halides, some carbonates and hydroxides and the like, of the defined metal groups, which are normally stable at the defined reaction temperatures are likewise effective under the conditions of the described reaction, as well as such compounds as the metal stannates, molybdenates, antimonates, bismuthates and the like. Particularly effective in the process of this invention are the defined metals and their oxides and salts. In addition, any metal or compound thereof of these groups which are convertible to or are converted under the described reaction conditions to an active catalytic state as the metal, oxide or salt thereof are likewise effective in the process of this invention. The metal oxides represent a useful class of materials, since they are inexpensive and are readily formed into pellets or deposited on carriers, and may be readily formed in situ from metals, salts and hydroxides. Although a great variety of metals and compounds have been found to be useful and effective in the process of the present invention, there are a number of materials which are unsatisfactory in the defined process.

The combination of a halogen-containing hydrocarbon at low partial pressure, iodine, oxygen and a metal or compound thereof at an elevated temperature involve complex reactions under conditions that make it difficult to determine the exact mechanism of the reaction involved. The conditions for practicing the invention are set forth in detail herein. Any metal or active compound thereof of the nature described which is effective in and contributes to the defined process; that is, which increases the yield of halogen-containing alkenes in the defined system, when present, should be included within the scope of the invention.

It will be readily recognized by the man skilled in the art that efficient and economical operations under the described reaction conditions will be a factor in the selection of a particular catalyst material or combination of catalyst materials. Stainless steel is a useful material because of its activity, stability, ease of handling, and the like. Any of the stainless steels which contain about 4 to 27 percent chromium, from 0 to 15 percent nickel and in some instances a small amount of molybdenum or manganese, may be employed. Particularly useful are any other combinations and alloys of the various metals found in the defined groups above. The metals may be used in the form of mesh, pellets, small diameter tubular reactors, and the like. In fixed bed operations the catalyst particles normally will pass a Tyler Standard screen of two-inch openings. Generally particles are used of which at least 50 percent will be retained on a 10 mesh Tyler screen. Metals and compounds thereof which have low melting points are suitably employed, for example, on porous carriers. The technique of fluidized beds lends itself well to the process of this invention. Of course, reactors lined with quartz or other inactive materials can be used, if loaded with active materials of the nature described. The effective catalyst, of course, is that of the surface exposed to the reactants in the dehydrogenation zone. The catalysts may contain other materials as binders, fillers and the like, but these normally will be less than 75 percent and preferably are below 25 percent of the exposed surface. Normally the catalyst will have a surface of greater than 10 square feet per cubic foot of reaction zone.

The total pressure on systems employing the process of this invention normally will be at or in excess of atmospheric pressure, although subatmospheric pressure can be used. However, the partial pressure of the halo compound is an important and critical feature of the invention. The partial pressure of the compound being dehydrogenated should be equivalent to below about 15 inches mercury absolute (about one-half atmosphere) when the total pressure is atmospheric to realize the advantages of this invention, and more preferably below 10 inches. Preferably the combined partial pressure of the material being dehydrogenated and the dehydrogenated product will also be below one-half atmosphere as one-third. The desired partial pressure is obtained and maintained by techniques known to those skilled in the art, including vacuum operations, helium, steam, and the like. Steam is particularly advantageous and it is surprising that the desired reaction to high yield of haloalkene is effected in the presence of large amounts of steam. When steam and oxygen are employed, the ratio of steam to a haloalkane is normally within the range of about 5 to 30 mols of steam per mol of haloalkane. At a steam to haloalkane ratio of 20 to 1, at atmospheric pressure, the partial pressure is about 1.5 inches. When air is employed as the source of oxygen, then less steam normally will be required. The degree of dilution of the reactants with steam, nitrogen and the like is related to keeping the partial pressure of the halo compound in the system at below 15 inches of mercury, and preferably below 10 inches mercury absolute or about one-third atmosphere when the total pressure on the system is one atmosphere in order to obtain optimum yields of haloalkene. The lower limit of partial pressure will be dictated by commercial considerations and practically will be greater than about 0.1 inch of mercury. When pressures above one atmosphere are employed, the values for haloalkane partial pressure cited above will be altered in direct proportion to the increase above one atmosphere.

The amount of oxygen used is also critical and must be at least one-fourth mol of oxygen per mol of compound to be dehydrogenated to about 2 to 5 mols of oxygen. Good yields of haloalkene have been obtained with amounts of oxygen from about 0.4 to about 1.5 mols of oxygen and within the range of above 0.25 to 2.0 mols of oxygen per mol of haloalkane, economic and operational considerations will dictate the exact molar ratio of oxygen used. Oxygen is supplied to the system as pure oxygen diluted with inert gases and as air. In relation to iodine, the amount of oxygen employed usually is greater than 1.25 moles of oxygen per atom of iodine, preferably greater than 1.5 moles of oxygen per atom of iodine.

Iodine employed in the process of this invention may be iodine itself, hydrogen iodide, organic iodides or any iodine-containing compound which decomposes under the reaction conditions defined herein to provide free iodine or hydrogen iodide. Such organic iodine compounds may include alkyl iodides including methyl iodide, ethyl iodide, propyl iodide, butyl iodide, amyl iodide, hexyl iodide, octyl iodide, iodoform and the like. Both primary, secondary and tertiary alkyl iodides may be employed. Similarly, aromatic and heterocyclic iodides may be employed, for example, phenyl iodide, benzyl iodide and the like. Preferred, of course among the organic iodides, for ease of handling and ready decomposition to iodine under reaction conditions are the lower alkyl iodides. Preferred from an economic basis, ease of handling and better all-around performance are iodine and/or hydrogen iodide which may be used interchangeably. It should be understood that when iodine is referred to herein, both in the specification and claims, that free iodine, under the conditions of reaction, is understood, regardless of the initial source of the iodine. Bromine and bromine compounds equivalent to those named above may be substituted for iodine and its compounds.

Amounts of halogen as small as 0.001 mol of iodine or bromine per mol of compound to be dehydrogenated have been found to be effective in the process of this invention. The iodine concentration normally will be varied from about 0.005 mol to about 0.1 mol of iodine per mol of a haloalkane, and from 0.01 to 0.09 mol of iodine per mol of haloalkane represents a useful range. Although amounts of iodine in excess of about 0.1 mol may be employed, as 0.2 and 0.5 mol, these larger amounts are not necessary and the larger amounts are more expensive and magnify processing difficulties including corrosion and the recovery of excess iodine and purification of the reaction product. At the higher temperatures of reaction, small amounts of iodine are effective. It is one of the advantages of this invention that in accordance with the defined process, very small amounts of iodine may be used in the dehydrogenation reaction. Iodine in amounts from about 0.01 to 0.1 mol per mol of haloalkane represents a useful range.

The reaction is an exothermic one and the temperature at which the reaction is conducted is from above about 400° C. to temperatures as high as 850° C., and more normally within the range of about 550° C. to about 800° C.

The flow rates of the gaseous reactants may be varied quite widely as from 0.1 to 10 liquid v./v./hr. and can be readily established by those skilled in the art. Good results are obtained with haloalkane flow rates ranging from about one-fourth to two liquid volumes of haloalkane/volume of reactor/hour, although lower and higher flow rates are contemplated. The residence or contact time of the reactants in the reaction zone under any given set of reaction conditions depends upon all of the factors involved in the reaction. Contact times ranging from about 0.1 to about 5 to 10 or 15 seconds have been found to be satisfactory. However, a wider range of residence times may be employed which may be as low as about 0.01 second to as long as several minutes, as high as about 3 minutes, although such long reaction times are not preferred. Normally, the shortest contact time consonant with optimum yields and operating conditions is desired. Residence time is the calculated dwell time of the reaction mixture in the reaction zone assuming the mols of product mixture are equivalent to the mols of feed mixture.

A variety of reactor types may be employed. For example, tubular reactors of small diameter made of stainless steel or other metal or alloys of the metals described above as catalysts for the reaction may be employed. In the case of small diameter reactors, the tube surface may represent the catalyst surface. Large diameter reactors will require loading with an active material to provide the required surface for efficient operation. Fixed bed reactors containing the metal or metal compound catalysts in the form of grids, screens, pellets, or supports and the like may also be used. In any of these reactors suitable means for heat removal may be provided. Fluid and moving bed systems are readily applied to the processes of this invention.

The process of this invention is useful in providing chloroalkenes from the corresponding chlorinated hydrocarbons, for example, chloroalkanes containing 2 to 6 carbon atoms and at least two hydrogen atoms on adjacent carbon atoms. The invention has particular utility in providing vinyl chloride in excellent yields from ethyl chloride as well as unsaturated derivatives generally of alkyl chlorides containing 2 to 4 carbon atoms and one chlorine atom. The process of this invention is readily adapted to providing haloalkenes having one or more double bonds and containing chlorine or fluorine from the corresponding aliphatic halides which contain at least one hydrogen atom on adjacent carbon atoms and 2 to 5 carbon atoms. For example, allyl chloride from propyl chloride, vinyl fluoride from ethyl fluoride, vinyl dichloride from ethyl dichloride, 4-chlorobutene-1 from butyl chloride, 2-chlorobutene from 2-chlorobutane as well as chlorobutadiene from both, chlorotrifluoroethylene from chlorotrifluoroethane, dichlorodifluoroethylene from dichlorodifluoroethane, and similar ethylenically unsaturated halogen derivatives from halogen derivatives of hydrocarbons containing 2 to 4 carbon atoms and 1 to 4 chlorine and/or fluorine atoms.

The manner of mixing the iodine or bromine or iodine compound, the compound to be dehydrogenated, oxygen-containing gas, and steam, if employed, is subject to some choice. In normal operations the haloalkane may be preheated and mixed with steam and preheated oxygen or air and iodine or hydrogen iodide are mixed therewith prior to passing the stream in vapor phase over the catalyst bed. Hydrogen iodide or a source of iodine may be dissolved in water and may be mixed with steam or air prior to reaction. The effluent reaction product from the reactor is cooled and then is passed to means for removing hydrogen iodide which normally will represent much of the iodine present during the course of the reaction, and the haloalkene product is then suitably purified as by fractionation to obtain the desired high purity haloalkene.

In the following examples will be found specific embodiments of the invention and details employed in the practice of the invention. Percent conversion represents mols of haloalkane consumed per 100 mols of haloalkane fed to the reactor and percent selectivity represents the mols of haloalkene formed per 100 mols of haloalkane consumed. These examples are intended as illustrative only, since numerous modifications and variations in accordance with the disclosure herein will be apparent to those skilled in the art.

A mixture of ethyl chloride, oxygen, air, hydrogen iodide, and steam were passed through a ¾ inch Vycor[1] (96 perecnt silica) reactor 18 inches long and packed with stainless steel wool. The steel wool contained 80.97 percent iron, 15.43 percent chromium, 0.2 percent nickel and traces of silica, phosphorous and maganese. The reactor was equipped to be heated with an electric furnace. The mixture of ethyl chloride, air, hydrogen iodide and steam was fed to this reactor at a flow rate equivalent to one-half liquid hourly space velocity of ethyl chloride in a molar ratio of one mol of ethyl chloride to 15 mols of steam, 0.8 mol of oxygen, and 0.04 mol of molecular iodine. The peak temperature of reaction in the stainless steel wool was found to be 700° C. and ethyl chloride was converted to vinyl chloride at a yield of 63.7 percent per pass at a conversion of 66.6 percent and selectivity of 95.6 percent. When the procedure above was repeated at a temperature of 750° C., the yield of vinyl chloride from ethyl chloride was 87.5 percent per pass, at a conversion of 96.3 percent and selectivity of 90.8 percent. When the above examples are repeated with iodine, ethyl iodide, bromine, and other active surfaces and other chloro- and fluorohydrocarbons of the type disclosed hereinabove as 2-chlorobutane, similar excellent yields of the defined haloalkene are obtained.

We claim:

1. The method for preparing halogen-containing alkenes wherein the halogen is selected from the group consisting of chlorine and fluorine which comprises dehydrogenating in the vapor phase at a temperature above 400° C. a halogen-containing alkane containing 2–6 carbon atoms, 1–4 halogen atoms and at least two hydrogen atoms on adjacent carbon atoms wherein the halogen is selected from the group consisting of chlorine and fluorine with oxygen in a molar ratio of greater than about one-fourth mol of oxygen per mol of halogen-containing alkane, a halogen liberating material wherein the halogen is selected from the group consisting of iodine and bromine in an amount of between 0.001 and 0.1 mol of halogen per mol of halogen-containing alkane, said oxygen being present in a ratio greater than 1.25 mols of oxygen per atom of halogen selected from the group consisting of iodine and bromine, the partial pressure of said halogen-containing alkane being equivalent to less than about 15 inches mercury at a total pressure of one atmosphere in the presence of a material selected from the group consisting of metals of Groups I–A, II–A, III–B, IV–B, V–B, VI–B, VII–B, VIII, II–B, III–A, IV–A, V–A and salts, oxides and hydroxides thereof.

2. The method for preparing chloroalkenes containing 2–6 carbon atoms which comprises dehydrogenating in the vapor phase at a temperature in the range of about 500° C. to 800° C. a chloroalkane containing 2–6 carbon atoms with oxygen in a molar ratio of about 0.25 to about 2 mols of oxygen per mol of chloroalkane, iodine in a molar ratio of about 0.005 to about 0.1 mol of iodine per mol of chloroalkane, said oxygen being present in a ratio of greater than 1.25 mols of oxygen per atom of iodine, the partial pressure of said chloroalkane being equivalent to less than about 10 inches mercury at a total pressure of one atmosphere in the presence of a contact mass selected from the group consisting of metals of Groups I–A, II–A, III–B, IV–B, V–B, VI–B, VII–B, VIII, II–B, III–A, IV–A, V–A and salts, oxides and hydroxides thereof.

3. The method for preparing chloroalkenes containing 2–4 carbon atoms which comprises dehydrogenating in the vapor phase at a temperature in the range of about 500° C. to about 800° C. a chloroalkane containing 2–4 carbon atoms and at least two hydrogen atoms on adjacent carbon atoms with oxygen in a molar ratio of above

---

[1] Trade name of Corning Glass Works, Corning, N.Y., for a glass which contains about 96 percent silica and the remainder being essentially $B_2O_3$.

0.25 to about 2 mols of oxygen per mol of chloroalkane and iodine liberating material in an amount of between 0.001 and 0.1 mol of iodine per mol of chloroalkane, said oxygen being present in a ratio of greater than 1.25 mols of oxygen per atom of iodine and steam in a molar ratio of about 5 to about 30 mols of steam per mol of chloroalkane in the presence of a material selected from the group consisting of metals of Group I–A, II–A, III–B, IV–B, V–B, VI–B, VII–B, VIII, II–B, III–A, IV–A, V–A and salts, oxides and hydroxides thereof.

4. The method for preparing vinyl chloride which comprises heating in the vapor phase at a temperature in the range of about 550° C. to about 800° C. ethyl chloride with oxygen in a molar ratio of between 0.4 to about 1.5 mols of oxygen per mol of ethyl chloride, between 0.01 and 0.1 mol of iodine per mol of ethyl chloride, said oxygen being present in a ratio greater than 1.25 mols of oxygen per atom of iodine, and steam in a molar ratio of about 5 to about 20 mols of steam per mol of ethyl chloride in the presence of stainless steel.

5. The method for preparing halogen-containing alkenes wherein the halogen is selected from the group consisting of chlorine and fluorine and containing 2 to 4 carbon atoms which comprises dehydrogenating in the vapor phase at a temperature in the range of about 500° C. to 750° C. a haloalkane containing 2 to 4 carbon atoms and 1 to 4 atoms of a halogen selected from the group consisting of chlorine and fluorine with oxygen in a molar ratio of 0.25 to about two mols of oxygen per mol of haloalkane, a halogen selected from the group consisting of iodine and bromine in a molar ratio of about 0.01 to about 0.1 mol of halogen per mol of haloalkane, said oxygen being present in a ratio greater than 1.25 mols of oxygen per atom of halogen selected from the group consisting of iodine and bromine, the partial pressure of said haloalkane being equivalent to less than about 10 inches mercury, at a total pressure of one atmosphere, in the presence of a contact mass selected from the group consisting of metals of Groups I–A, II–A, III–B, IV–B, V–B, VI–B, VII–B, VIII, II–B, III–A, IV–A, V–A and salts, oxides and hydroxides thereof.

6. In a process for preparing halogen-containing alkenes wherein the halogen is selected from the group consisting of chlorine and fluorine which comprises dehydrogenating at an elevated temperature a halogen-containing alkane containing 2–6 carbon atoms, at least 1–4 halogen atoms, and at least two hydrogen atoms on adjacent carbon atoms wherein said halogen is selected from the group consisting of chlorine and fluorine with oxygen and a halogen liberating material wherein the halogen is selected from the group consisting of iodine and bromine, the improvement which comprises conducting the reaction with greater than about 0.25 mol of oxygen and from about 0.001 to 0.1 mol of halogen per mol of halogen containing alkane, said oxygen being present in a ratio greater than 1.25 mols of oxygen per atom of halogen selected from the group consisting of iodine and bromine in the presence of a material selected from the group consisting of metals of Groups I–A, II–A, III–B, IV–B, V–B, VI–B, VII–B, VIII, II–B, III–A, IV–A, V–A and salts, oxides and hydroxides thereof, said halogen-containing alkane being maintained at a partial pressure equivalent to less than about 15 inches mercury at one atmosphere pressure.

7. In a process for preparing chloroalkenes which comprises dehydrogenating at a temperature between 550° C. and 800° C. a chloroalkane containing 2–6 carbon atoms and at least two hydrogen atoms on adjacent carbon atoms with oxygen and iodine, the improvement which comprises conducting the reaction with between above 0.25 and 1.75 mols of oxygen per mol of chloroalkane, between about 0.01 and 0.1 mol of iodine per mol of chloroalkane, said oxygen being present in a ratio greater than 1.25 mols of oxygen per atom of iodine, and between 5 to 15 mols of steam per mol of chloroalkane in the presence of stainless steel, said chloroalkane being maintained at a partial pressure equivalent to less than about 15 inches mercury at one atmosphere of pressure.

8. In a process for preparing halogen-containing alkenes wherein the halogen is selected from the group consisting of chlorine and fluorine which comprises dehydrogenating at an elevated temperature halogen-containing alkanes containing 2–4 carbon atoms and 1–4 halogen atoms, wherein the halogen is selected from the group consisting of chlorine and fluorine with oxygen and an iodine-liberating material, the improvement which comprises conducting the reaction with greater than about 0.25 to about 3 mols of oxygen and greater than about 0.005 to less than 0.1 mol of iodine per mole of halogen-containing alkane, said oxygen being present in a ratio greater than 1.25 mols of oxygen per atom of iodine, said halogen-containing alkane being maintained at a partial pressure equivalent to less than about 15 inches mercury at one atmosphere of pressure in the presence of a material selected from the group consisting of metals of Groups I–A, II–A, III–B, IV–B, V–B, VI–B, VIII, II–B, III–A, IV–A, V–A and salts, oxides and hydroxides thereof.

9. A method for preparing unsaturated chlorine-containing hydrocarbons which comprises dehydrogenating in the vapor phase at a temperature above 400° C. a chlorine-containing hydrocarbon of 2–6 carbon atoms and 1–4 chlorine atoms with oxygen in a molar ratio of greater than ¼ mol of oxygen per mol of chlorine-containing hydrocarbon, a halogen-liberating material wherein the halogen is selected from the group consisting of iodine and bromine in an amount of between 0.001 and 0.1 mol of halogen per mol of chlorine-containing hydrocarbon, said oxygen being present in a ratio greater than 1.25 mols of oxygen per atom of halogen selected from the group consisting of iodine and bromine, the partial pressure of said chlorine-containing hydrocarbon being equivalent to less than 15 inches mercury at a total pressure of one atmosphere in the presence of a material selected from the group consisting of metals of Groups I–A, II–A, III–B, IV–B, V–B, VI–B, VII–B, VIII, II–B, III–A, IV–A, V–A and salts, oxides and hydroxides thereof.

10. A method for dehydrogenating straight chain aliphatic chlorides containing 2 to 4 carbon atoms with oxygen in a molar ratio of greater than one-fourth to about two mols of oxygen per mole of aliphatic chloride and a halogen selected from the group consisting of iodine and bromine in an amount greater than 0.001 to 0.1 mole of halogen per mole of aliphatic chloride, said oxygen being present in a ratio greater than 1.25 mols of oxygen per atom of halogen selected from the group consisting of iodine and bromine at a partial pressure of aliphatic chloride equivalent to less than one-third atmosphere at a total pressure of one atmosphere in the presence of a catalyst selected from the group consisting of metals of Groups I–A, II–A, III–B, IV–B, V–B, VI–B, VII–B, VIII, II–B, III–A, IV–A, V–A and salts, oxides and hydroxides thereof.

11. The method for preparing chlorine-containing alkenes which comprises dehydrogenating in the vapor phase at a temperature above 400° C. an alkyl chloride containing 2 to 4 carbon atoms, one chlorine atom, and at least two hydrogen atoms on adjacent carbon atoms with oxygen in a molar ratio of greater than one-fourth mol of oxygen per mol of alkyl chloride, a halogen-liberating material wherein the halogen is selected from the group consisting of iodine and bromine in an amount of between 0.001 and 0.1 mol of halogen per mol of alkyl chloride, said oxygen being present in a ratio greater than 1.25 mols of oxygen per atom of halogen selected from the group consisting of iodine and bromine, the partial pressure of said alkyl chloride being equivalent to less than about 15 inches mercury at a total pressure of one atmosphere in the presence of a material selected from the group consisting of metals of Groups I–A, II–A, III–B, IV–B, V–B, VI–B, VII–B, VIII, II–B, III–A, IV–A, V–A and salts, oxides and hydroxides thereof.

References Cited

UNITED STATES PATENTS

| | | | |
|---|---|---|---|
| 2,890,253 | 6/1959 | Mullineaux et al. | 260—680 |
| 2,921,101 | 1/1960 | Magovern | 260—680 |
| 2,951,103 | 8/1960 | Ellsworth et al. | 260—654 |
| 2,991,320 | 7/1961 | Hearne et al. | 260—680 |
| 3,040,109 | 6/1962 | Feathers et al. | 260—654 |

LEON ZITVER, *Primary Examiner.*

K. V. ROCKEY, H. T. MARS, *Assistant Examiners.*